US010234952B2

(12) United States Patent
Parvarandeh et al.

(10) Patent No.: US 10,234,952 B2
(45) Date of Patent: Mar. 19, 2019

(54) WEARABLE DEVICE FOR USING HUMAN BODY AS INPUT MECHANISM

(71) Applicant: Maxim Integrated Products, Inc., San Jose, CA (US)

(72) Inventors: Pirooz Parvarandeh, Los Altos Hills, CA (US); Anthony Stephen Doy, Los Gatos, CA (US)

(73) Assignee: Maxim Integrated Products, Inc., San Jose ( * ) Notice: Subject to any disclaimer, the term of this patent is extended or adjusted under 35 U.S.C. 154(b) by 238 days.

(21) Appl. No.: 14/616,865

(22) Filed: Feb. 9, 2015

(65) Prior Publication Data

US 2016/0018948 A1   Jan. 21, 2016

Related U.S. Application Data

(60) Provisional application No. 62/026,524, filed on Jul. 18, 2014.

(51) Int. Cl.
G09G 5/00 (2006.01)
G06F 3/01 (2006.01)
G06F 1/16 (2006.01)
G06F 3/042 (2006.01)

(52) U.S. Cl.
CPC ............. *G06F 3/017* (2013.01); *G06F 1/163* (2013.01); *G06F 1/169* (2013.01); *G06F 3/0425* (2013.01)

(58) Field of Classification Search
None
See application file for complete search history.

(56) References Cited

U.S. PATENT DOCUMENTS

| 2006/0181482 | A1* | 8/2006 | Iaquinto | A61B 6/00 345/8 |
| 2006/0290682 | A1* | 12/2006 | Ake | G06F 3/03545 345/173 |
| 2007/0296707 | A1* | 12/2007 | Kang | G06F 1/1616 345/172 |
| 2008/0074401 | A1* | 3/2008 | Chung | G02F 1/1368 345/175 |
| 2008/0318691 | A1* | 12/2008 | Rofougaran | A63F 13/235 463/42 |
| 2009/0128716 | A1* | 5/2009 | Nagashima | G06F 3/0423 348/756 |
| 2009/0139778 | A1* | 6/2009 | Butler | G06F 1/1626 178/18.03 |

(Continued)

*Primary Examiner* — Carl Adams
(74) *Attorney, Agent, or Firm* — North Weber & Baugh LLP; Michael V. North

(57) ABSTRACT

The invention relates to wearable devices for sensing gestures. A watch, which is a wearable device, includes an ultrasonic system that has an ultrasonic transducer and one or more sensors and measures the location of a finger on the back of the user's hand. Using the ultrasonic system, it is possible to use the back of the hand as an extension to the screen display of the watch. The watch can be used as a motion detector and interface with various types of mobile devices, such as computerized eyeglass. The watch can also function as a generic input mechanism for various types of devices, such as tablet, TV, or laptop computer, where these devices are coupled to the watch via a suitable communication system, such as Bluetooth® interconnection system.

19 Claims, 9 Drawing Sheets

(56) References Cited

U.S. PATENT DOCUMENTS

| | | | |
|---|---|---|---|
| 2010/0013799 A1* | 1/2010 | Kim | G06F 3/0433 345/177 |
| 2011/0298732 A1* | 12/2011 | Yoshimoto | G06F 3/041 345/173 |
| 2012/0223916 A1* | 9/2012 | Kukulj | G06F 3/0421 345/175 |
| 2012/0249409 A1* | 10/2012 | Toney | G06F 3/017 345/156 |
| 2012/0274550 A1* | 11/2012 | Campbell | G06F 3/04883 345/156 |
| 2014/0306936 A1* | 10/2014 | Dahl | G06F 3/0436 345/177 |

* cited by examiner

WEARABLE DEVICE FOR USING HUMAN BODY AS INPUT MECHANISM

CROSS REFERENCE TO RELATED APPLICATIONS

This application claims the benefit of U.S. Provisional Application No. 62/026,524, entitled "Wearable device for using human body as input mechanism," and filed Jul. 18, 2014.

BACKGROUND

A. Technical Field

The present invention relates to gesture sensing devices, and more particularly, to wearable devices for sensing gestures.

B. Background of the Invention

The importance of mobile computing and associated markets is well understood by one of skill in the art. One rapidly growing market within mobile computing relates to wearable computing devices (e.g., watches, glasses) that provide significantly more processing ability and features not previously available on wearable items. These wearable computing devices have miniaturized electronics and improved their power efficiency to enable integrated computing and sensing features. However, the small form factor of these wearable devices makes it difficult for a user to interact or command the devices.

An exemplary wearable device is a smart watch that is a computerized watch and has enhanced functions, similar to those found on today's smart phones, as well as timekeeping. While early models can perform basic tasks, such as calculations, translations, and game-playing, modern smart watches can run mobile applications and/or a mobile operating system and function as portable media players, offering playback of FM radio, audio, and video files to the user via a Bluetooth headset. It is quite likely that the future smart watches will be equipped with other add-ons for additional functions.

A conventional smart watch has a screen that is substantially smaller than the screen of a PDA or a smart phone device. Therefore, it is very difficult for an individual to interface with the watch. The keyboards and touchscreens used on mobile phones to type, select, write or draw are obviously not useable on a smart watch with a substantially smaller footprint. The number of icons usefully displayed and selectable on a small touchscreen are obviously limited compared to a smart phone or PDA. Other conventional wearable devices with small form factors have the similar problem in providing a means for navigating on the screen and doing various motions, such as writing letters, numbers, so on. Therefore, a better solution is needed to provide an improved way of interfacing with wearable devices so that the users may be able to control the wearable devices with convenience.

SUMMARY OF THE DISCLOSURE

In one aspect of the present invention, a wearable device includes: a display; a transmitter for sending a signal; a set of sensors for detecting the signal reflected from a first finger and generating output signals; and a signal processor for processing the output signals and mapping the position of the first finger on the display.

BRIEF DESCRIPTION OF THE DRAWINGS

References will be made to embodiments of the invention, examples of which may be illustrated in the accompanying figures. These figures are intended to be illustrative, not limiting. Although the invention is generally described in the context of these embodiments, it should be understood that it is not intended to limit the scope of the invention to these particular embodiments.

DETAILED DESCRIPTION OF THE PREFERRED EMBODIMENTS

In the following description, for the purposes of explanation, specific details are set forth in order to provide an understanding of the invention. It will be apparent, however, to one skilled in the art that the invention can be practiced without these details. One skilled in the art will recognize that embodiments of the present invention, described below, may be performed in a variety of ways and using a variety of means. Those skilled in the art will also recognize additional modifications, applications, and embodiments are within the scope thereof, as are additional fields in which the invention may provide utility. Accordingly, the embodiments described below are illustrative of specific embodiments of the invention and are meant to avoid obscuring the invention.

A reference in the specification to "one embodiment" or "an embodiment" means that a particular feature, structure, characteristic, or function described in connection with the embodiment is included in at least one embodiment of the invention. The appearance of the phrase "in one embodiment," "in an embodiment," or the like in various places in the specification are not necessarily all referring to the same embodiment.

Furthermore, connections between components or between method steps in the figures are not restricted to connections that are effected directly. Instead, connections illustrated in the figures between components or method steps may be modified or otherwise changed through the addition thereto of intermediary components or method steps, without departing from the teachings of the present invention.

Various embodiments of the invention relate to a wearable device, such as a smart watch, for sensing gestures of the device user. The device allows the extension of the touch screen control of the device to the back of the hand or to the arm. This extension allows the user to have a much larger user interface (UI) surface to work with. Also, all of the functions that a touch screen controller are extended to a much larger and more convenient surface, effectively separating the display and selection/control functions.

Figure 1:
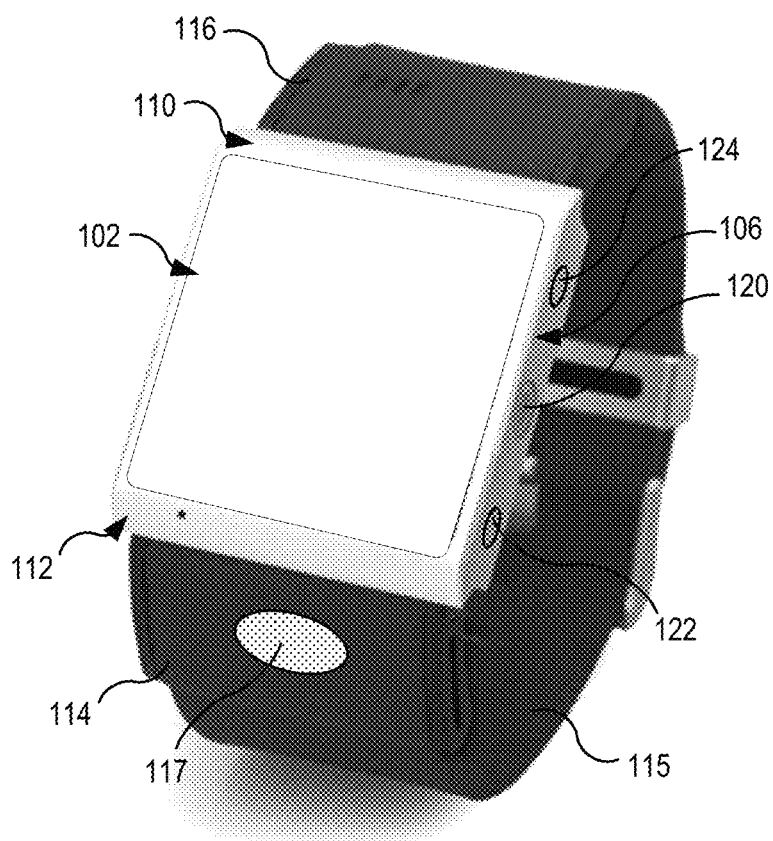
FIG. 1 shows a perspective view of a wearable device for sensing gestures according to one embodiment of the present invention.

FIG. 1 shows a perspective view of a wearable device 100 for sensing gestures according to one embodiment of the present invention. For the purpose of illustration, the device is shown to be a watch, even though the device 100 may have other suitable shapes and may encompass a number of different wearable items. As depicted in FIG. 1, the device 100 includes: an upper face (or, equivalently, a display screen) 102; an outer face 106 facing the knuckles; an inner face 104 facing the arm and sleeve; a bottom face 108 in proximity to the wrist; an outward looking face 110 pointing away from the user's body; an inward looking face 112 pointing toward the body; an inward facing strap 114; a conductive patch 117 disposed on the inward facing strap 114; an outward facing strap 116; and a band 115.

Figure 2:
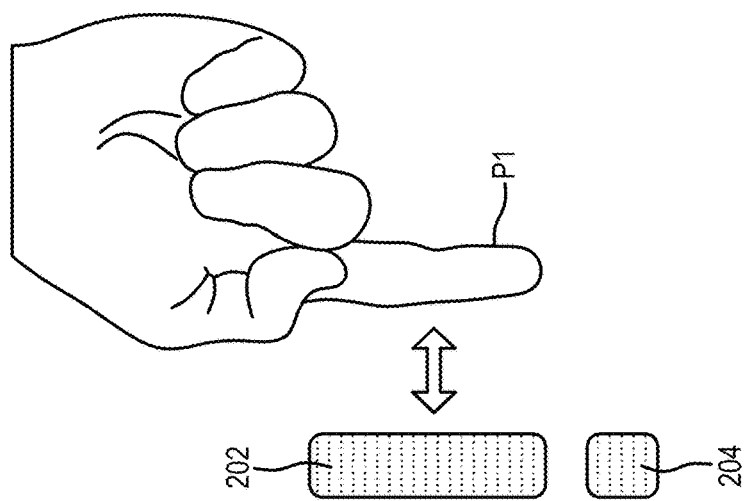
FIG. 2 shows a top view of the wearable device in FIG. 1 and a finger for controlling the device.
Figure 2:
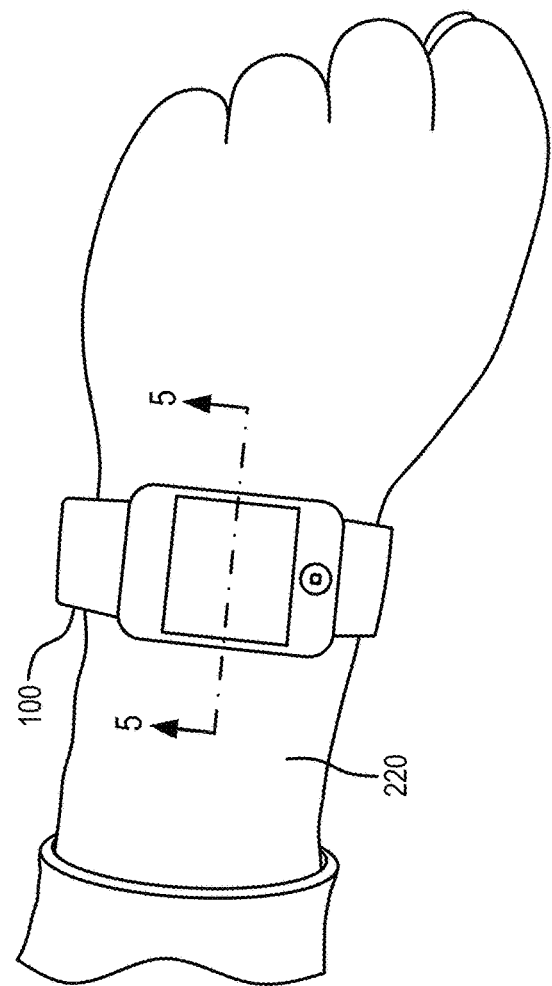

FIG. 2 shows a top view of the wearable device 100 in FIG. 1 and a finger P1 for providing control inputs to the device 100. For the purpose of illustration, the side and top views of the finger P1 are represented by rounded rectangles 202 and 204, respectively. As will be discussed, the user may use the finger P1 to control the wearable device 100.

In embodiments, an ultrasonic system may be used to determine the position of the finger P1, where the ultrasonic system includes one or more ultrasonic transducer and one or more sensors mounted on the outer face 106 of the wearable device 100. For example, as depicted in FIG. 1, one transducer 120 may be disposed near the middle region of the outer face 106 and two sensors, such as microphones, 122 and 124 may be disposed on either end of the outer face 106. In another example, two transducers (not shown in FIG. 1) may be disposed on either end of the outer face 106 and one sensor may be disposed near the middle region of the outer face. It should be apparent to those of ordinary skill in the art that other suitable number of transducers and sensors may be included in the wearable device 100. Also, the transducers and sensors may be used for other purposes. For instance, in embodiments, at least one of the sensors 122 and 124 may be used as a regular microphone to pick up the speaker's voice. In embodiments, a regular speaker for a smartwatch can double up as the transducers for emitting ultrasound signals.

Figure 3A:
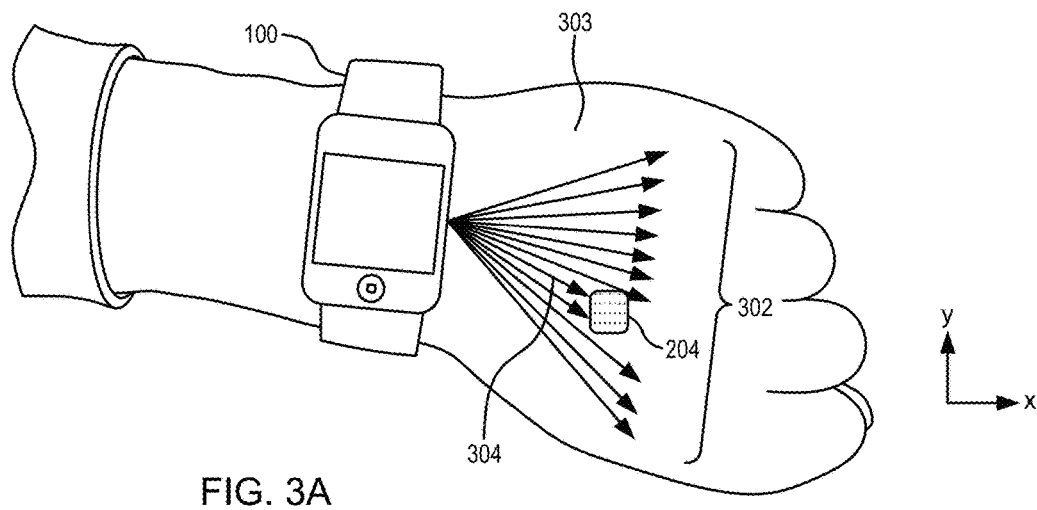
FIGS. 3A and 3B show top views of the wearable device in FIG. 1, illustrating how to determine the location of a finger according to one embodiment of the present invention.
Figure 3B:
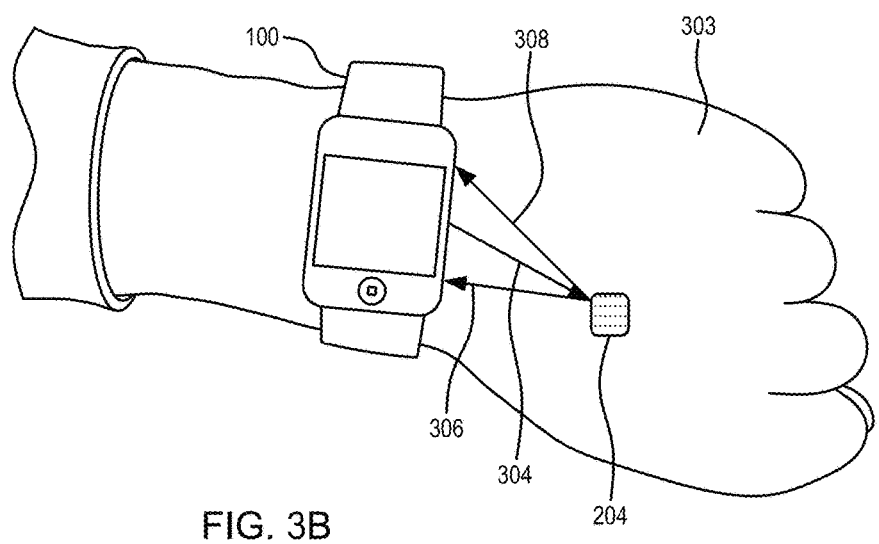

FIGS. 3A and 3B show top views of the wearable device 100 in FIG. 1, illustrating how to determine the location of the finger 204 according to one embodiment of the present invention. As depicted, the transducer 120 emits an ultrasonic wave/pulse that is represented by arrows 302. In embodiments, a suitable electrical component, such as integrated circuit, installed in the device 100 may produce an excitation pulse for the transducer 120. A portion of the ultrasonic pulse, say 304, is reflected by the finger 204 and the sensors 122 and 124 detect the reflected signals (or, equivalently, ping signals) 306 and 308. The time-of-arrivals at the sensors, which are denoted as TR1 and TR2, respectively, are measured to calculate the time-of-flights (TOFs) of the reflected signals 306 and 308, which in turn are used to determine the position of the finger 204. In embodiments, the triangulation method may be used to determine the position of finger 204. For example, if the two TOFs are identical, the finger 204 is located on a symmetric axis passing through the transducer 120. Also, the magnitudes of the TOFs are used to determine the distance between the finger 204 and the device 100. Likewise, the total magnitudes of the TOFs and the difference between the TOFs are used to determine the position of the finger 204. The transmit (or ping) signals may be at the same ultrasonic carrier frequency, pushed alternately from each transmitter in a time interleaved fashion; or, for example, transmitted simultaneously but at different carrier frequencies, allowing detection in both time and frequency domains.

Figure 4A:
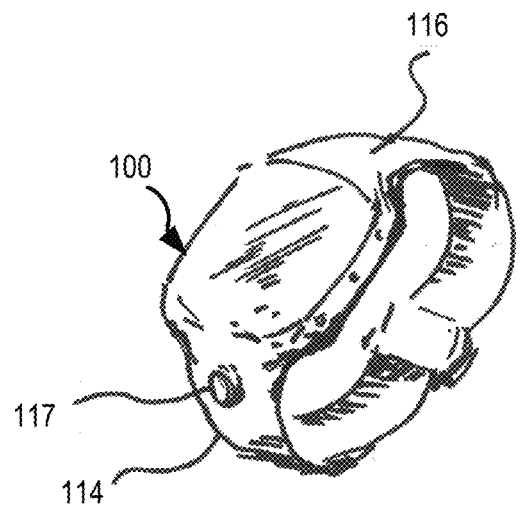
FIG. 4A shows a perspective view of the device in FIG. 1
Figure 4B:
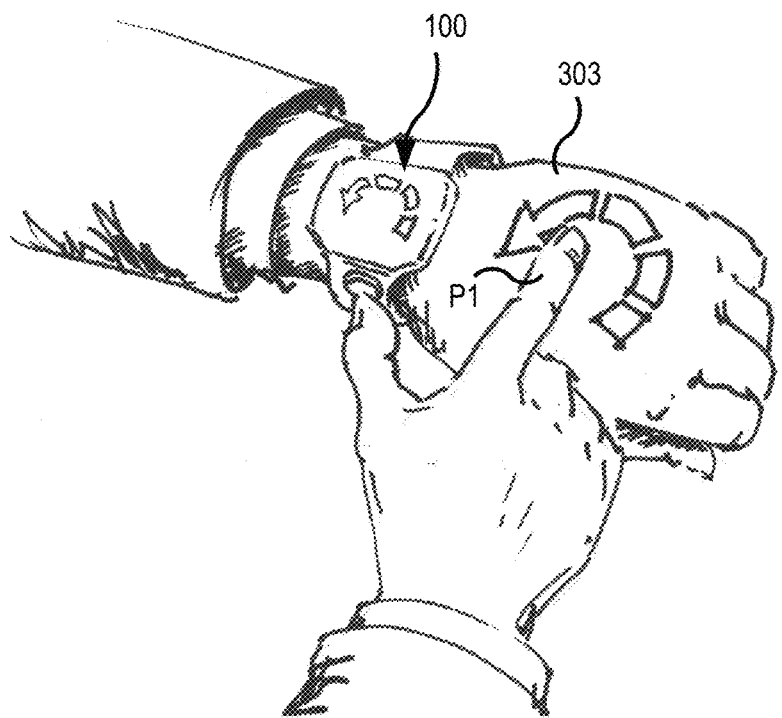
FIG. 4B shows how to operate the device according to another embodiment of the present invention.

Since the ultrasonic system can determine the location of the finger 204, it is possible to use the back of the hand 303 as an extension to the screen display 102, i.e., the user can make patterns (gestures, motions, writing, etc.) on the back of the hand. Hereinafter, the term gesture collectively refers to motions of the finger P1. FIG. 4A shows a perspective view of the device 100 and FIG. 4B shows how to operate the device according to another embodiment of the present invention. As depicted in FIG. 4B, the position of the finger P1 can be mapped onto the screen display 102 as the user moves the finger P1 on the back of the hand 303.

Figure 5A:
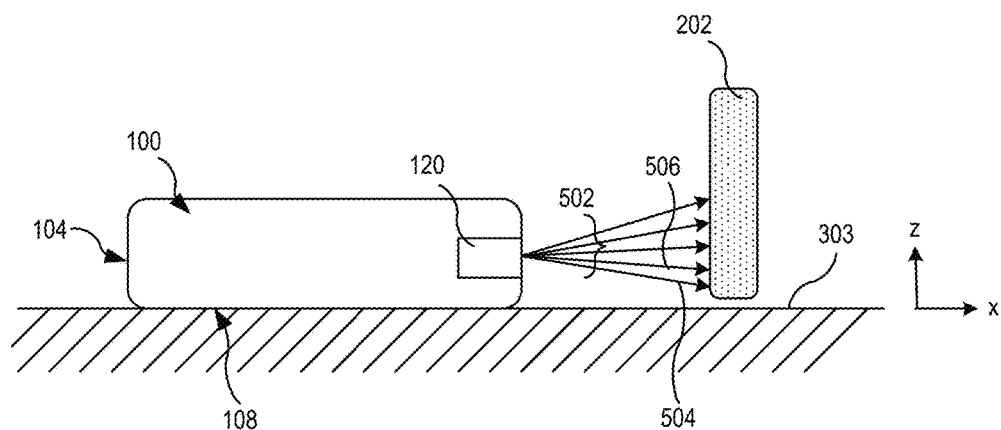
FIGS. 5A and 5B show cross sectional views of the wearable device in FIG. 1, illustrating a mechanism for determining the location of a finger according to another embodiment of the present invention.
Figure 5B:
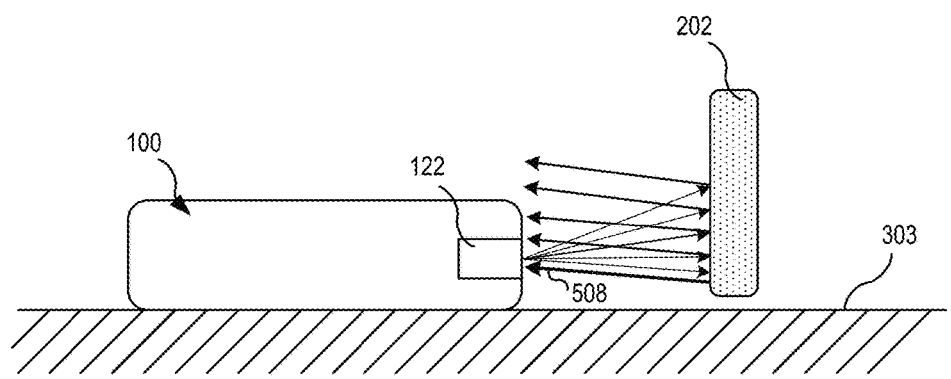

Since the device 100 measures only two TOFs, the z-coordinate of the finger P1 may be indeterminate. However, if the transducer 120 has an emission pattern that is largely confined to the x-y plane and has very little emission along the z-axis, then it can be assumed that the z-axis value of the finger does not have any noticeable effect on the TOF measurement. FIGS. 5A and 5B show cross sectional views of the wearable device 100 taken along the line 5-5 in FIG. 2, illustrating a mechanism for determining the location of a finger according to another embodiment of the present invention. As depicted in FIG. 5A, the ultrasonic pulse 502 emitted by the transducer 120 has an angular dispersion along the z-axis. Also, the distance travelled by one portion 504 of the ultrasonic pulse would be different from the distance travelled by another portion 506 of the pulse. Since the reflections of the two portions 504 and 506 may arrive at the sensor 122, the time-of-flight measured by the sensor 122 would have a certain distribution. However, if the ultrasonic pulse 502 has a narrow angular dispersion along the z-axis so that the pulse is largely confined to the x-y plane, the accuracy of TOF measurement can be assumed to be acceptable. In embodiments, the ultrasonic pulse 502 emitted by the transducer 120 would be largely confined to the plane defined by the back of the hand 303. Also, in embodiments, the shortest TOF measured by each sensor may be used to determine the position of the finger 202. For instance, as depicted in FIG. 5B, the shortest TOF, which is the time interval required for a pair of the beams 504 and 508 to travel the distance between the device 100 and the finger 202 may be used to determine the position of the finger 202.

In embodiments, a simple switch/button (not shown in FIGS. 1-5B) may be used to put the wearable device 100 into a mode for accepting the gestures on the back of the hand 303 as valid inputs. For instance, the user may push/touch a mode switch on the device 100 so that the ultrasonic system enters into the mode to listen for inputs, and the same switch can be used to terminate this mode. Other modes, such as an initialization mode, may also be present and allow a user to configure the device.

Figure 6A:
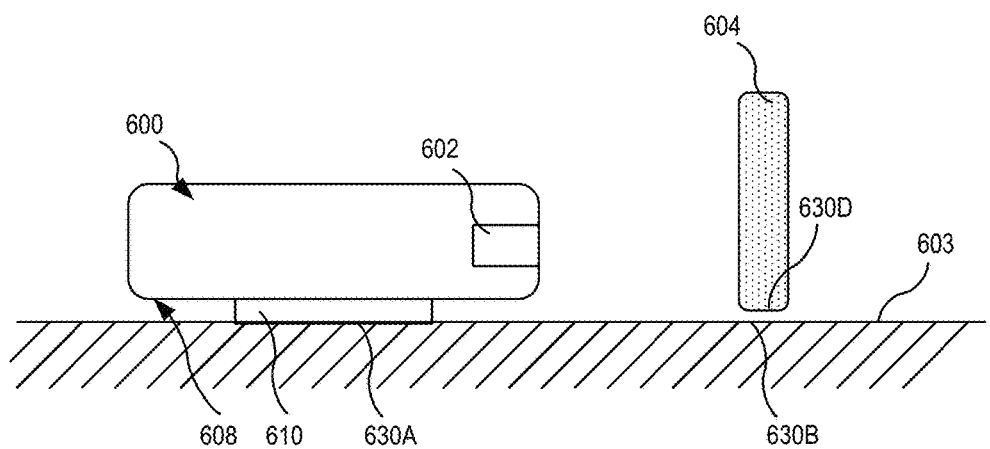
FIGS. 6A and 6B show a cross sectional view and a side view of a wearable device, respectively, illustrating how to "select/click" on the device according to another embodiment of the present invention.
Figure 6B:
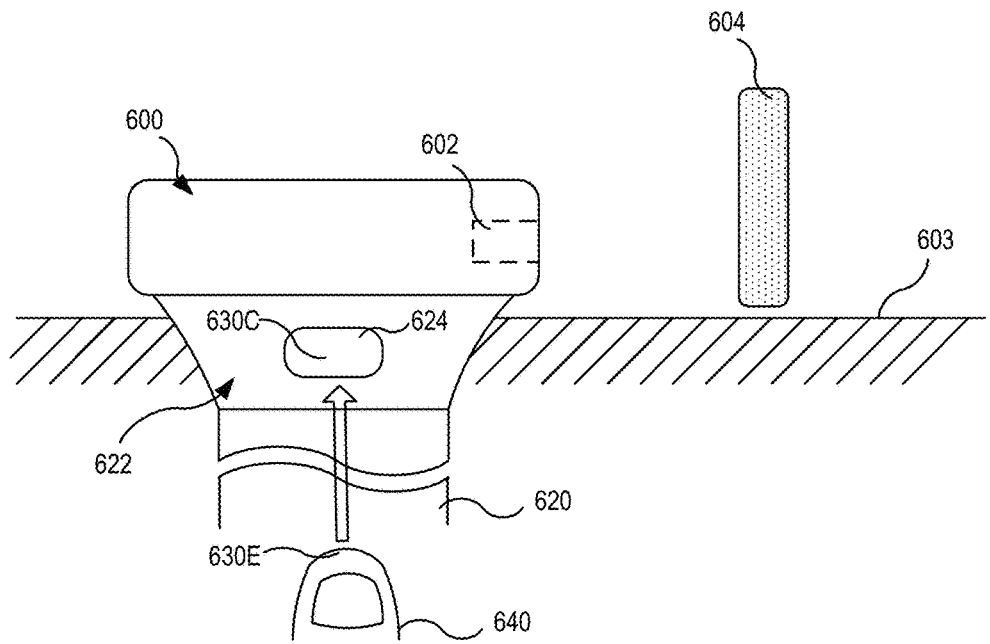

FIGS. 6A and 6B show a cross section view and a side view of a wearable device 600, respectively, illustrating how to "select/click" on the device according to another embodiment of the present invention. Since the device 600 is similar to the device 100 in FIG. 1, the detailed description of the device 600 is not repeated for brevity. As depicted, the device 600 includes: a transducer 602 for measuring the position of the finger 604 on the back of the hand 603; a first conductive patch 624 (which corresponds to the conductive patch 117 in the device 100) disposed on the inward facing strap 622; a second conductive patch 610 disposed on the bottom face 608; and a band 620. The first conductive patch 624 is electrically connected to the second conductive patch 610 so that the first conductive patch 624 is in electrical contact with the skin of the user's wrist at a location 630A.

When the user places his finger 604 on the back of his hand 603 to make the tip 630D of the finger 604 contact the hand at a location 630B and places his thumb 640 on the first conductive patch 624 to make the tip 630E of the thumb contact the first conductive patch 624 at a location 630C, the electrical path, which includes the thumb 640→first conductive patch 624→second conductive patch 610→first skin contact 630A→second skin contact 630B→finger 604, gets "closed." Thus, a resistance measurement of this electrical path can be made to determine whether the finger 604 is in contact with the back of the hand 603. For instance, the resistance will change from the infinity down to a finite value when the finger 604 touches the back of the hand 603. For the purpose of illustration, define this resistance measurement as M1.

In a similar fashion, as the user places his right thumb on the first conductive patch 624, a capacitance measurement can be made to determine if the finger 604 is getting closer or farther away from the back of the hand 603. For the purpose of illustration, define this capacitance measurement as M2. The combination of the four sensor inputs, TR1, TR2, M1 and M2, may provide useful positional information: (1) location of the finger 604 in the x-y plane on the back of the hand, (2) whether the finger 604 is touching the back of the hand, and (3) the distance along the z-axis between the tip 630C of the finger 604 and the back of the hand 603. The third information may be either the resistance measurement or the capacitance measurement as discussed above.

It is noted that the resistance and capacitance measurements do not need to be used separately. In embodiments, the combination of the resistance and capacitance measurements may be given different meanings. For instance, the detection of resistance and capacitance may be performed simultaneously, to thereby expand the space for possible "meaning."

In embodiments, various combinations of the sensor inputs may be used to represent "clicks" as well as writing/gesture/motion on the back of the hand 603, thereby making the back of the hand a useful extension of the small touch-screen surface 102. For instance, the user may generate a "click" signal by placing the tip 630E of his right thumb 640 on the first conductive patch 624 while making the tip 630D of the finger 604 touch the back of the hand 603. In this case, the resistance measurement M1 may be used as a sensor input. In another example, the user may generate a "click" signal by placing the tip 630E of his right thumb 640 on the first conductive patch 624 while placing the tip 630D of the finger 604 within a preset distance from the surface of the back of the hand 603. In this case, the capacitance measurement M2 may be used as a sensor input.

In addition to the four sensor inputs, the sensors may be used to generate other types of sensor inputs. In embodiments, one or more of the sensors 122 and 124 may include a microphone for picking up the noise when the finger 604 touches the back of the hand 603. It is noted that, in embodiments, other parameters, such as the Doppler shift of the reflected signal, can be assigned "meanings."

In embodiments, the inputs from all of these sensors may be mapped into various functions, such as clicks, selections, gestures etc., i.e., the inputs may be given different meanings. Also, the inputs may be mapped into audio signals of different amplitudes and/or frequencies.

It is noted that additional sensors may be implemented in the wearable device 100 (or 600). In embodiments, two additional sensors may be installed on the inner face 108 of the device, making the user's arm 220 (shown in FIG. 2) become another surface that is an extension of the touch-screen surface 102.

In embodiments, the device 100 (or 600) may determine positions of multiple fingers on the back of the hand 303. For instance, with two fingers (denoted as A and B) on the back of the hand, the sensor 122 may receive two reflected signals, TR1-A and TR1-B, and the sensor 124 may receive two reflected signals, TR2-A and TR2-B. By combination of these four measurements, a fair amount of information can be extracted. For instance, as the user increases the distance between the two fingers while the fingers are in contact with the back of the hand, the corresponding portion of the image displayed on the screen 102 may be enlarged. In embodiments, more complex arrays of the transducers may be implemented in the device 100 (or 600) so that a phased-array sweep function is added.

As discussed, there are five contact areas: the contact area 630A between the second conductive patch 610 and the back of the wrist; the contact area 630B on the back of the hand; the contact area 630C on the second conductive patch 624; the tip 630D of the finger 604; and the tip 630E of the thumb 640. Table 1 shows the list of direct impedances between the five contact areas. In Table 1, the term physical refers to a passive connection between two corresponding contact points and the term variable means that the two corresponding contact points are connected to active electronics in the device 600 (or 100).

TABLE 1

List of direct impedances

| | 630A | 630B | 630C | 630D | 630E |
| --- | --- | --- | --- | --- | --- |
| 630A | — | Physical | variable | — | — |
| 630B | Physical | — | — | Physical | — |
| 630C | Variable | — | — | — | Physical |
| 630D | — | Physical | — | — | Physical |
| 630E | — | — | Physical | Physical | — |

Figure 7A:
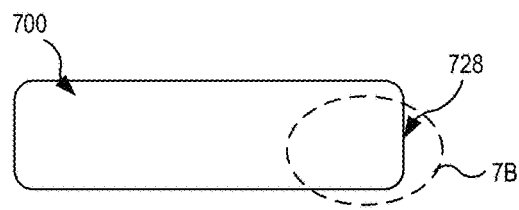
FIGS. 7A-7C show cross sectional views of a wearable device according to another embodiment of the present invention.
Figure 7B:
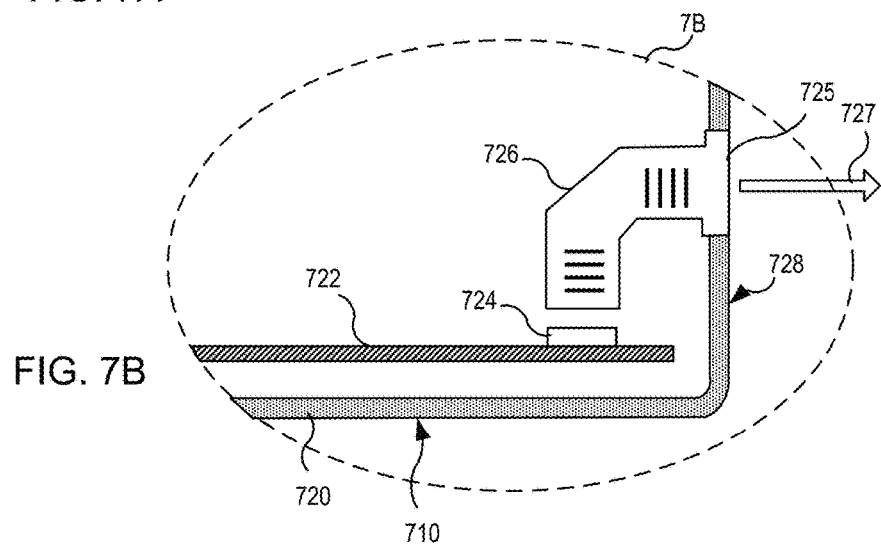
Figure 7C:
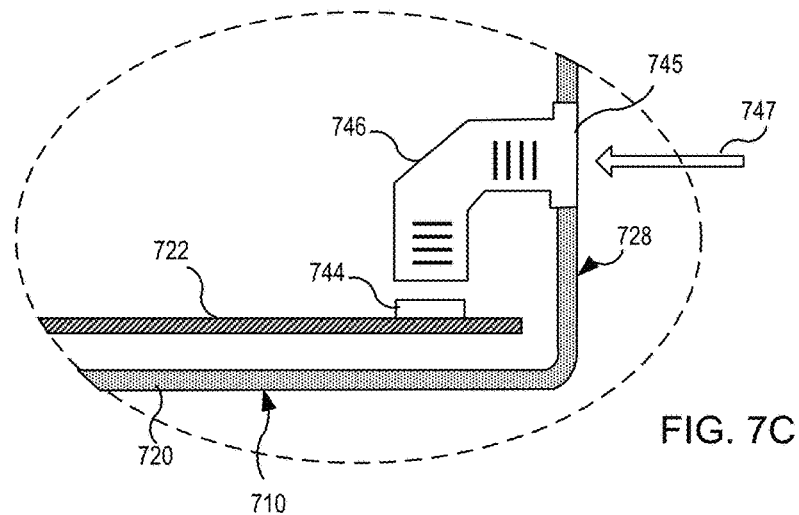

As depicted in FIG. 1, the transducer 120 and two sensors 122 and 124 are mounted on the outer surface 106 of the device 100. However, it should be apparent to those of ordinary skill in the art that these components may be disposed at other locations in the device 100. FIG. 7A shows a cross section view of a wearable device 700 according to another embodiment of the present invention and FIGS. 7B and 7C show enlarged views of two portions of the device 700. The device 700 is similar to the device 100 (or 600), with the difference that the ultrasonic transducer 724 and sensor 744 are mounted on a suitable substrate 722, such as PCB. The ultrasonic sound generated by the transducer 724 travels through the waveguide 726 and exits an outlet 725 formed on a housing 720 of the device 700 to proceed in the direction 727. Likewise, a reflected signal 747 travelling in the direction 747 enters into an inlet 745 formed on the housing 720 and is guided to a sensor 744 by a waveguide 746, where the sensor 744 is mounted on the substrate 722. It is noted that only one sensor 744 is shown in FIG. 7C for brevity, even though the device 700 may include more than one sensor.

The waveguides 726 and 746 may be formed of any suitable material, such as plastic, and move the audio energy from the outer surface 728 to a plane parallel to a bottom surface 710. This configuration of the transducer 724 and sensor 744 not only simplifies the construction of the device but also add a degree of robustness because the transducer and the sensors are physically placed away from the outer surface 728 and are therefore less exposed. This configuration also allows wave-shaping to thereby create a flat wave-front. It is also noted that the transducer 724 (and transducers 120, 602 in FIGS. 1 and 6) may be any suitable signal generator, such as a typical electrodynamic speaker or piezoelectric transducer.

In embodiments, the sensors of the devices 100 (or 600, 700) may be calibrated so that the devices are customized for the user. For instance, a user may touch/push an initialization switch/button to put the device 100 into the initialization mode. In this mode, the user may move the finger P1 to the largest extent that he wants along one tendon of a finger and click the device to set an outer boundary on the back of the hand 303. Likewise, the user may move the finger P1 to the smallest extent that he wants along the same tendon and click the device to set an inner boundary on the back of the hand 303. By repeating these steps on one or more tendons, the user can lay out the entire boundaries of the area that he wants to use to control the device 100. Also, the user can partition his hand into nine grids for dialing numbers.

Figure 8:
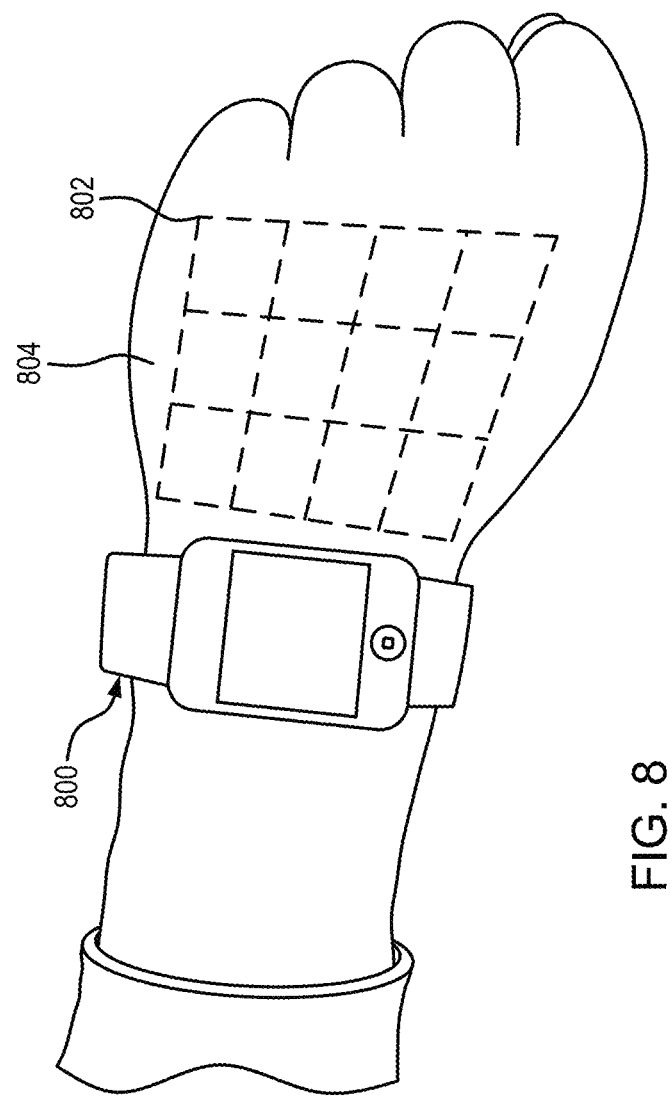
FIG. 8 shows a top view of a wearable device, illustrating how to form a visual memory of the back of the user's hand according to another embodiment of the present invention.

In embodiments, the wearable device 100 (or 600, 700) can function as a motion detector and interface with various types of mobile devices. For instance, the user may wear a computerized eyeglass that exchange signals with the wearable device 100 via a suitable communication device, such as Bluetooth® interconnection or other wireless communication system. FIG. 8 shows a top view of a wearable device 800, illustrating how to form a visual memory of the back of the user's hand according to another embodiment of the present invention. In embodiments, the user may use a computerized eyeglass (shortly, eyeglass) as a tool for forming a visual memory of the back of the user's hand. As depicted, the use may wear the eyeglass, where the eyeglass may provide an image of a grid 802 so that the user can move his finger to select one of the grid elements. Likewise, the user may perform other types of motions, such as scrolling, while watching his hand through the eyeglass. As such, the wearable device 800 transforms the back of the hand 804 into a human interface of the eyeglass computer.

In embodiments, the user may use the eyeglass as a tool for forming a visual memory of the back of the user's hand. While watching the back of hand through the eyeglass, the user may associate natural reference points, such as knuckles and different points on the back of the fingers, with grid points, to thereby form visual memory of the back of the user's hand. However, it is not necessary to use an eyeglass to form the visual memory of the back of the user's hand, i.e., the user may form the visual memory using any other suitable tools in embodiments.

In embodiments, the wearable device 100 (or 600, 700) can function as a generic input mechanism (UI) for various types of devices. For example, the wearable device 100 may be coupled to a desktop computer via a suitable communication system so that the user can operate the computer by controlling the wearable device. In another example, the wearable device 100 may be coupled to a tablet or TV via a suitable communication system so that the user can remotely control the tablet or TV by operating the wearable device. Connecting to a laptop computer and display system, another example would be controlling the advancing and scrolling of slides in a presentation.

In embodiments, the wearable device 100 (or 600, 700) may be used to detect the "flexing" of the user's wrist. For instance, instead of using the finger P1, the wearable device 100 can detect the upward motion of the wrist and a useful meaning can be assigned to this motion. Furthermore, the degree of flexing may have an impact on TR1 and TR2 so that the user can convey an analogue quantity to the wearable device.

In embodiments, the wearable devices in FIGS. 1-8 may include other suitable types of systems to measure the location of a finger(s). For instance, an IR source (such as IR LED) and sensors may be used in place of the ultrasonic transducer and ultrasonic sensors. The IR source may emit the light in a radial fashion to form a flat cone field as in the case of ultrasonic transducer. The IR sensor/receiver may have angular sensitivity, i.e., it may be able to determine the angular position of the finger relative to the sensor surface. A shadowing mechanism or venetian blind constructions may be installed on the sensor to determine the angle of incidence of the reflected light relative to the sensor surface. In addition, the intensity of the reflected light may be used to determine the distance between the sensor and the finger. Furthermore, the intensity of the reflected light can be used to determine whether the finger is moving away from or toward the device.

Figure 9:
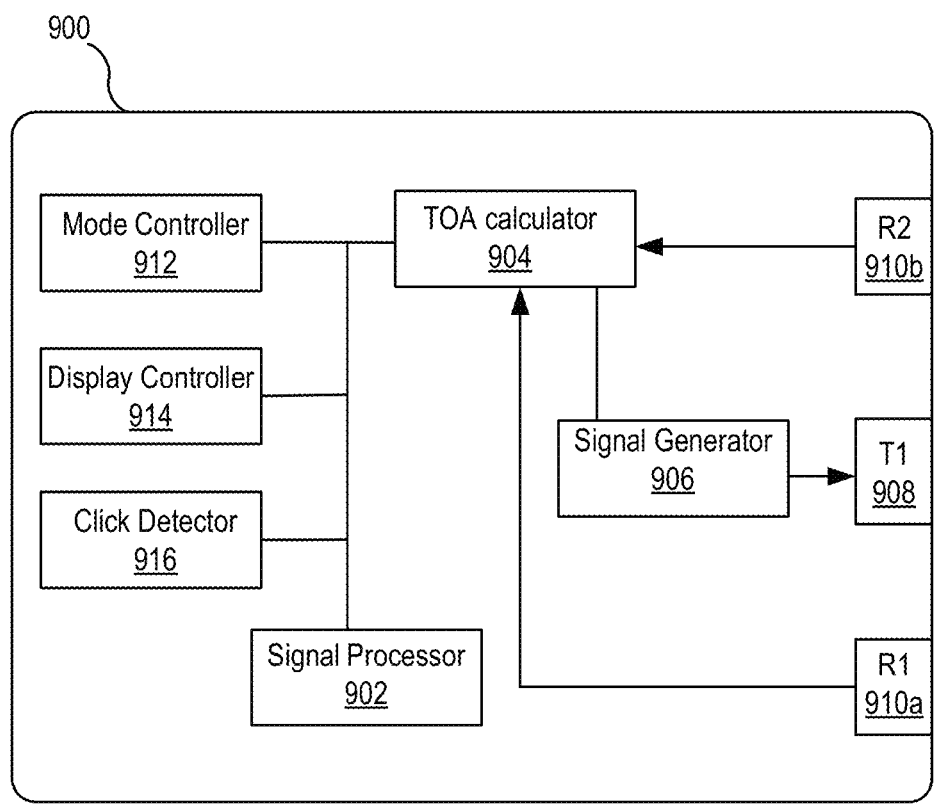
FIG. 9 is a functional block diagram of a wearable device according to another embodiment of the present invention.

FIG. 9 is a functional block diagram of a wearable device 900 according to another embodiment of the present invention. As depicted, the wearable device 900, which can perform the various functions of the devices 100, 600, and 700, may include: a signal generator 906; a transducer/emitter 908 coupled to the signal generator and operative to emit an ultrasonic signal; one or more sensors 910 for detecting a reflected signal; and an time-of-flight (TOA) calculator 904 coupled to the signal generator, transducer/emitter, and the one or more sensors. When the signal generator 906 sends a signal to the transducer/emitter 908, it also sends a first notification to the TOA calculator 904. When the one or more sensors 910 receive the reflected signals and send second notifications to the TOA calculator 904, the TOA calculator determines the time intervals between the first and second notifications to measure the time of flights. The wearable device 900 also includes a signal processor 902 coupled to the TOA calculator 904, where the signal processor 902 determines the location of the finger based on the measured time of flights. In embodiments, the TOA calculator 904 may be incorporated into the signal processor 902.

It is noted that the transducer/emitter 908 may be an IR source and the one or more sensors 910 may be IR sensors. In such a case, each sensor may detect the angle of incidence and intensity of the reflected light, and the signal processor 902 would determine the location of the finger based on these measured quantities.

Referring back to FIG. 9, the wearable device 900 may include other components; click detector 916 for detecting the click signal, a display controller 914 for controlling the display panel (such as 102) of the device, and a mode controller 912 for allowing the user to change the operational mode of the device. The click detector 916 may use one or more of the four inputs, TR1, TR2, M1 and M2, as discussed in conjunction with FIGS. 6A and 6B, to detect the user's "select/click" motion. The device 900 may include a switch/button (not shown in FIG. 9) that the user may touch/push to change the mode. When the user touches the switch, the mode controller 912 connected to the switch changes the operational mode of the device.

It is noted that the device 902 may include other components and/or some of the components in FIG. 9 may be integrated into one body. For instance, the switch/button for the mode change may be protruding from a surface of the device or an image displayed on the screen (102 in FIG. 1). It should be apparent to those of ordinary skill in the art that the components in the device 900 may be implemented in various configurations.

While the invention is susceptible to various modifications and alternative forms, specific examples thereof have been shown in the drawings and are herein described in detail. It should be understood, however, that the invention is not to be limited to the particular forms disclosed, but to the contrary, the invention is to cover all modifications, equivalents, and alternatives falling within the scope of the appended claims.

What is claimed is:

1. A wearable device, comprising:
   a display;
   a transmitter for sending a signal;
   a set of sensors for detecting the signal reflected from a first finger on a surface external to the wearable device and generating output signals;
   a signal processor for processing the output signals to map a position of the first finger on the surface external to the wearable device onto the display; and
   a first conductive patch receiving touch from a second finger to form an electrical path between the first finger and the second finger via the first conductive patch when the first finger touches the surface, the position of the first finger on the surface is displayed on the display when the second finger touches the first conductive patch.

2. The wearable device as recited in claim 1, wherein the signal processor determines the position of the first finger based on a time interval for the signal to travel from the transmitter to the set of sensors.

3. The wearable device as recited in claim 1, further comprising:
   another transmitter for sending another signal; and
   another set of sensors for detecting another signal reflected from a third finger and generating other output signals;
   wherein the signal processor is adapted to process the other output signals and map a position of the third finger on the display.

4. The wearable device as recited in claim 3,
   wherein the position of the third finger is displayed on the display when a second finger touches the first conductive patch.

5. The wearable device as recited in claim 1, wherein the set of sensors is adapted to receive another signal reflected by a second finger and generate other output signals and wherein the signal processor is adapted to control an image on the display based on a distance between the first and second fingers.

6. The wearable device as recited in claim 1, further comprising:
   a second conductive patch electrically connected to the first patch and adapted to directly contact a skin of a user wearing the wearable device.

7. The wearable device as recited in claim 6, wherein, when the second finger of the user touches the first patch and the first finger of the user touches the skin of the user, the electrical path between the first finger and the second finger is closed.

8. The wearable device as recited in claim 7, wherein a click signal is generated when the electrical path is closed.

9. The wearable device as recited in claim 6, wherein an electrical capacitance changes as a tip of the first finger approaches the skin while the second finger touches the first conductive patch.

10. The wearable device as recited in claim 9, wherein a click signal is generated when a distance between the skin and the tip of the first finger is less than a present value.

11. The wearable device as recited in claim 1, further comprising:
    a substrate for mounting the transmitter thereto;
    an outlet for sending the signal therethrough; and
    a waveguide coupled to the transmitter and the outlet, where the signal travels from the transmitter to the outlet through the waveguide.

12. The wearable device as recited in claim 1, further comprising:
    a substrate for mounting the set of sensors thereto;
    a set of inlets for receiving the signal reflected by the first finger therethrough; and
    a set of waveguides coupled to the set of sensors and the set of inlets, where the signal received through the set of inlets travels from the set of inlets to the set of sensors through the set of waveguides.

13. The wearable device as recited in claim 1, wherein an eyeglass computer provides an image of a grid having multiple grid elements over an area and wherein the signal processor maps the position of the first finger to one of the multiple elements.

14. The wearable device as recited in claim 1, further comprising:
    a communication system for communicating data to an external device to thereby allow a user wearing the wearable device to control the external device by operating the wearable device.

15. The wearable device as recited in claim 1, wherein the signal includes one or more ultrasonic signals and the ultrasonic signals have a same carrier frequency.

16. The wearable device as recited in claim 1, wherein the signal includes one or more ultrasonic signals and the ultrasonic signals have different carrier frequencies.

17. The wearable device as recited in claim 1, wherein the transmitter is an infrared (IR) source and each of the set of sensors is an IR sensor having angular sensitivity to determine an angular position of the first finger relative to a surface of the each sensor.

18. The wearable device as recited in claim 17, wherein an intensity of the signal reflected by the first finger is used to determine a distance between the wearable device and the first finger.

19. The wearable device as recited in claim 1, wherein the wearable device has a shape of a wrist watch.

* * * * *